United States Patent [19]
Gattuso et al.

[11] Patent Number: 5,632,427
[45] Date of Patent: May 27, 1997

[54] FISHING ROD AND REEL HOLDER

[76] Inventors: John Gattuso, 16 Sylvia La., Plainview, N.Y. 11803; Ken Garstka, 99 Brooksite Dr., Smithtown, N.Y. 11787

[21] Appl. No.: 649,279

[22] Filed: May 17, 1996

[51] Int. Cl.$^6$ .................. B25H 5/00; B60R 9/08
[52] U.S. Cl. ............... 224/309; 224/200; 224/251; 224/323; 224/324; 224/529; 224/922; 211/70.8; 248/512; 43/21.2
[58] Field of Search ................ 224/309, 319, 224/323, 324, 211, 917.5, 559, 922, 103, 162, 200, 251, 406, 488, 492, 537, 329, 572; D12/412, 413; 211/70.8; 248/511, 512, 515; 43/21.2

[56] References Cited

U.S. PATENT DOCUMENTS

| | | | |
|---|---|---|---|
| 2,907,506 | 10/1959 | Sammons | 224/922 |
| 3,524,572 | 8/1970 | Hall | 211/70.8 |
| 4,209,098 | 6/1980 | Adams | 211/70.8 |
| 4,871,099 | 10/1989 | Bogar, Jr. | 224/922 |
| 5,184,797 | 2/1993 | Hurner | 248/515 |
| 5,446,989 | 9/1995 | Stange et al. | 43/21.2 |

*Primary Examiner*—Henry J. Recla
*Assistant Examiner*—Timothy L. Maust
*Attorney, Agent, or Firm*—Nolte, Nolte & Hunter, P.C.

[57] ABSTRACT

A fishing rod and reel holder having a body which includes a cylinder having openings at both ends of the cylinder for receiving rod handles. A J-shaped slot in the cylinder accepts a reel mount. An elastic tensile member, such as a shock cord, biases the reel mount against the tip of the curl of the J, thereby securing the rod and reel within the cylinder. A recess, approximately coaxial with the cylinder, and distal from the cylinder, supports the rod's shaft towards the front of the holder. Suction cups mount the body securely to a surface, such as a car top.

9 Claims, 5 Drawing Sheets

FISHING ROD AND REEL HOLDER

FIELD OF INVENTION

This application relates to a rack for holding fishing rods and reels. The holder is particularly adapted for mounting to an automobile roof for transportation, but can also be used as a storage or transportation holder aboard boats, in a home, mounted atop a tackle box, or used as a hand carrying rack.

BACKGROUND OF INVENTION

Various general purpose roof racks have been used to carry fishing rods atop automobiles. The present invention departs from the general purpose roof-rack in that the invention's size, mounting, holder geometry, and simplicity are particularly adapted for use by the sport fisherman.

It is the object of the present invention to provide a fishing rod and reel holder which easily receives the rods and reels and mounts them without difficulty and securely in the holder. It is a further object to provide mounting means which enable the loaded holder to be easily and securely mounted to an automobile roof. It is a further object to receive and securely mount both spinning reels and conventional reels. It is a further object to provide a structure that can, with all the rods in place: easily be hand carried; be mounted atop an automobile roof; be dismounted easily; be mounted aboard a boat; be stored in a home; and be mounted on a wall in a garage. It is a further object of this invention to provide an inexpensive and aerodynamic structure.

BRIEF DESCRIPTION

The present invention is a fishing rod and reel holder. A rod and spinning reel are received by inserting the rod handle in a tubular holder, said holder comprising a slot for receiving the reel mount. The slot is J-shaped, defined herein to include a reverse J. The reel mount travels down the stem of the J, is rotated around the rod's longitudinal axis through the base of the J, and is then pulled against the tip of the curl of the J by a shock cord affixed to the base of the holder. The holder may comprise a plurality of receivers for a plurality of rods.

The holder is particularly adapted for the top of a vehicle, and can be dismounted and placed on a wall, or mounted on an overhead of a boat for carrying the rods below, or mounted on the outside of a boat. Curved receivers provide second support points for the rod shafts. Between the curved receivers and the tubular handle holders, molded handles are located along the sides, and an indentation is provided, between the molded handles, for a strap to be placed through the handles, over the slot, and around the roof and headliner of a vehicle, to further secure the holder to the vehicle in a simple fashion.

The holder can serve as a lid for a tackle box.

DETAILED DESCRIPTION OF THE DRAWINGS

Figure 1:
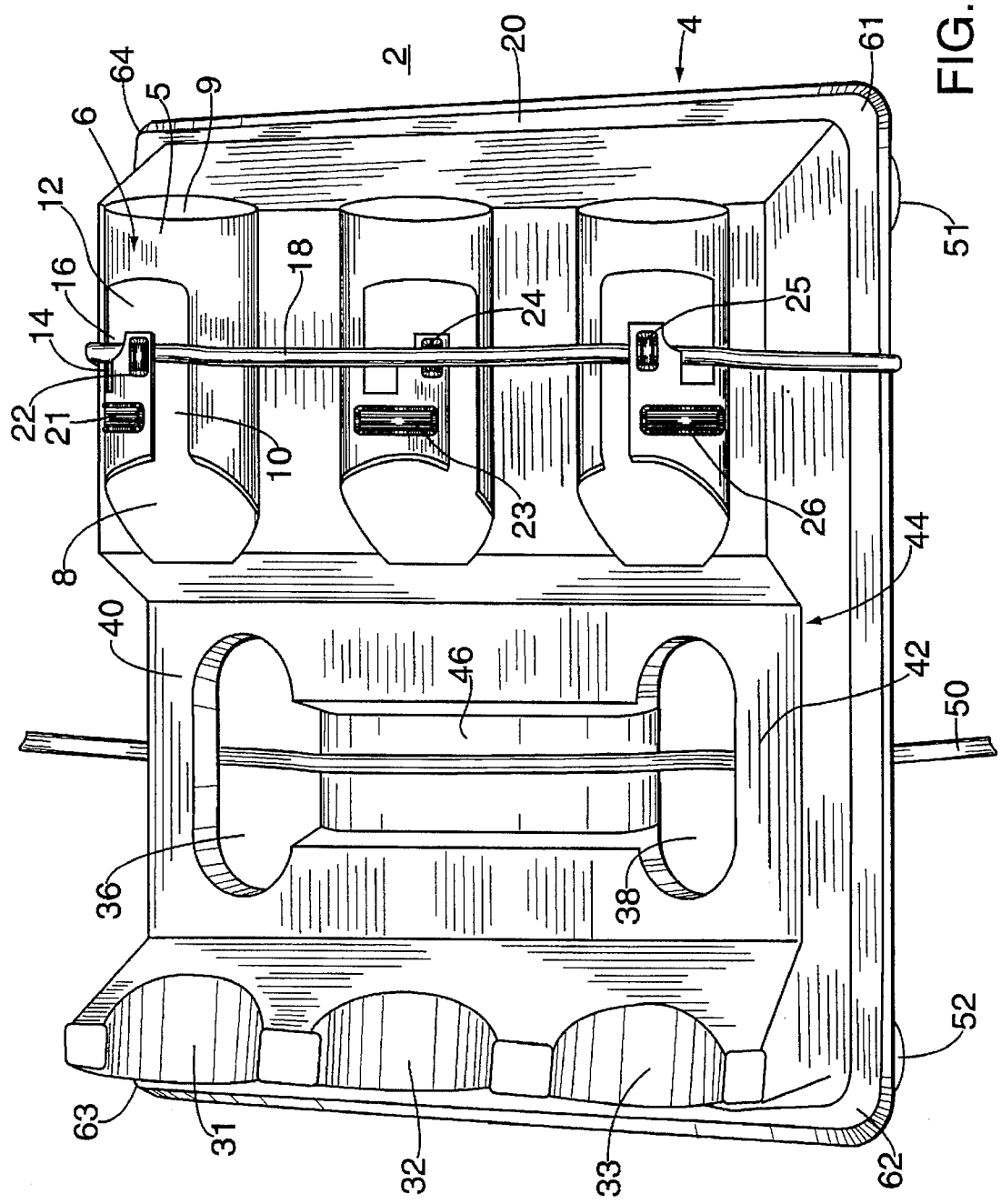
FIG. 1 is an oblique view of the present invention.
Figure 2:
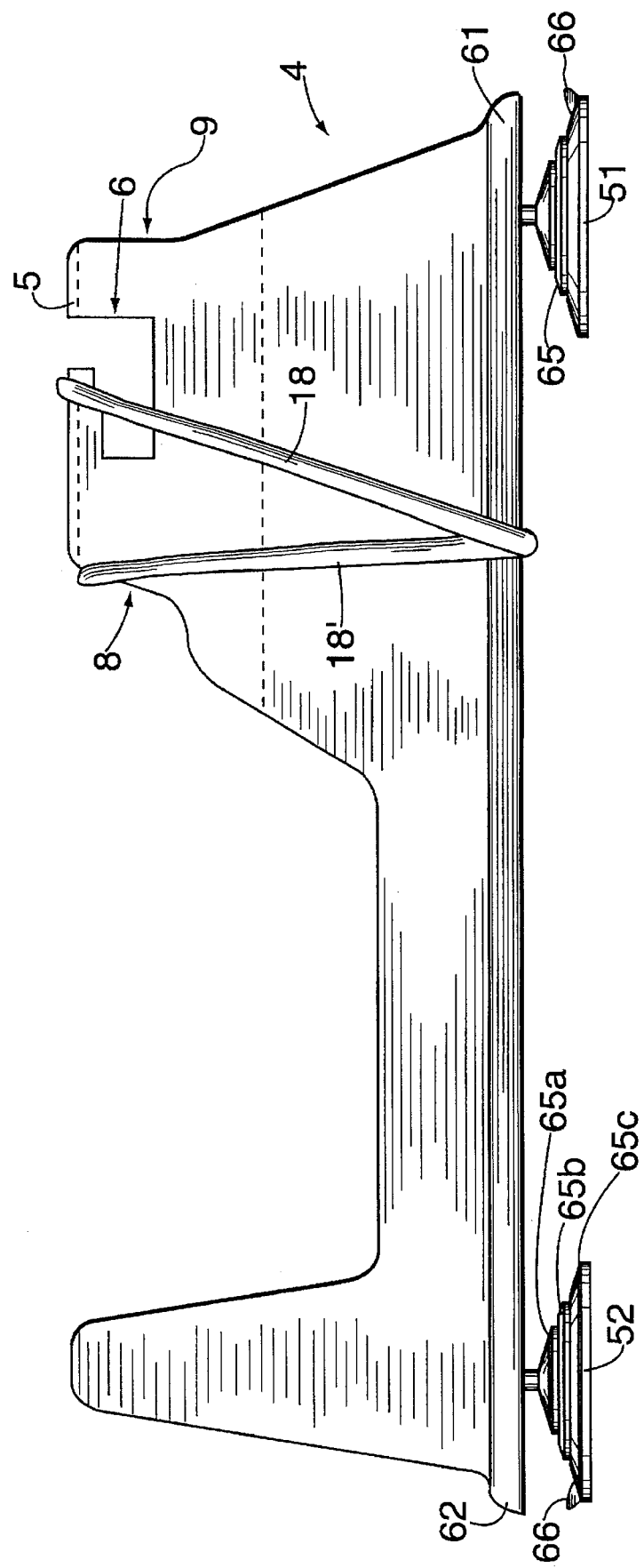
FIG. 2 is a side elevation thereof.
Figure 3:
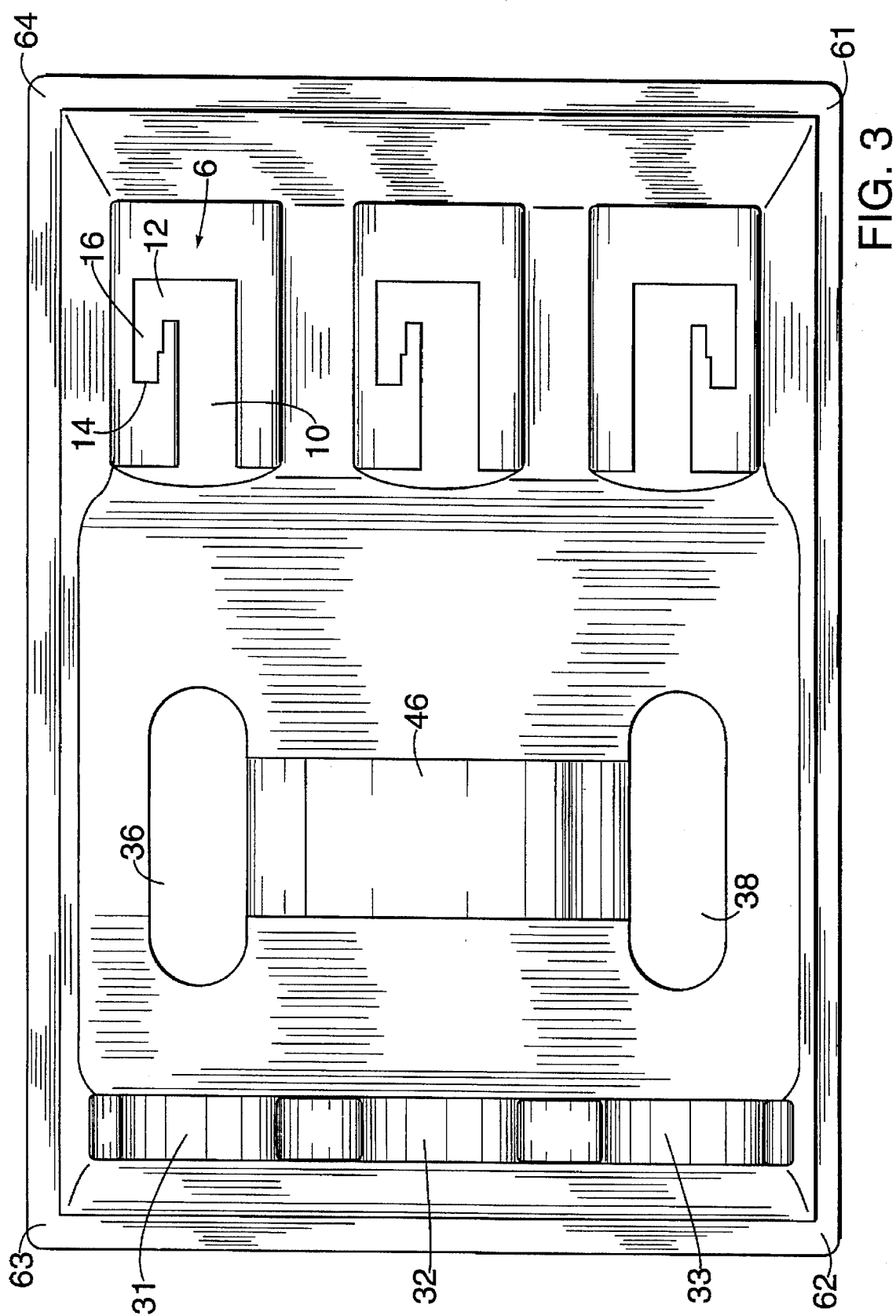
FIG. 3 is a top plan view thereof.
Figure 4:
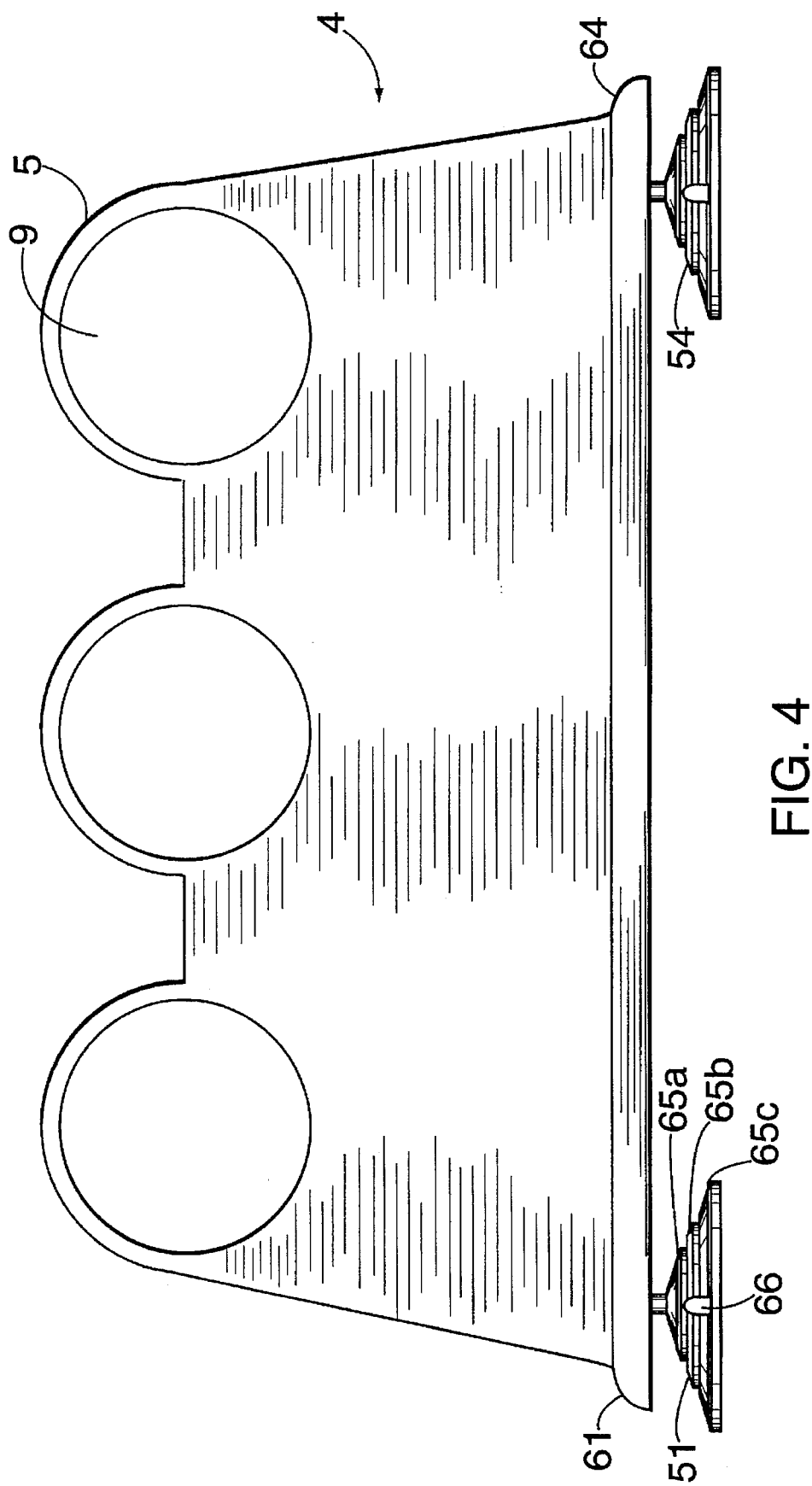
FIG. 4 is a rear elevation thereof.

FIG. 1 shows, in oblique view, the present best mode of the rod holder, generally designated 2, comprising mainly a molded plastic body 4. The body comprises one or more cylindrical rod handle receivers 5, in this case three cylindrical receivers. Each receiver has a J-shaped notch 6, into which the mount for a spinning reel may be inserted as the handle for a fishing rod is slid into opening 8 of cylinder 5, to protrude out opening 9 in the other end of the cylinder. The reel mount slides down stem 10 of the J, and the rod handle is then rotated, bringing the reel mount across bottom 12 of the J, until it is finally brought home against the tip 14 of curl 16 of the J 6.

Shock cord 18 is secured beneath base 20 of rod holder 2, forwardly of the tip 14 of the J 6. The shock cord applies a bias forwardly so that the reel and its attached rod cannot escape the curl of the J to work its way out of securement. Dimples, 21–26 are molded into the thin plastic shell of the holders 5, in order to stiffen the unsupported plastic which defines the J.

The same shock cord 18' can bias a reel against either cylinder opening 8 or 9 in cases where a reel mount is too wide to fit in J-slot 6.

Figure 5:
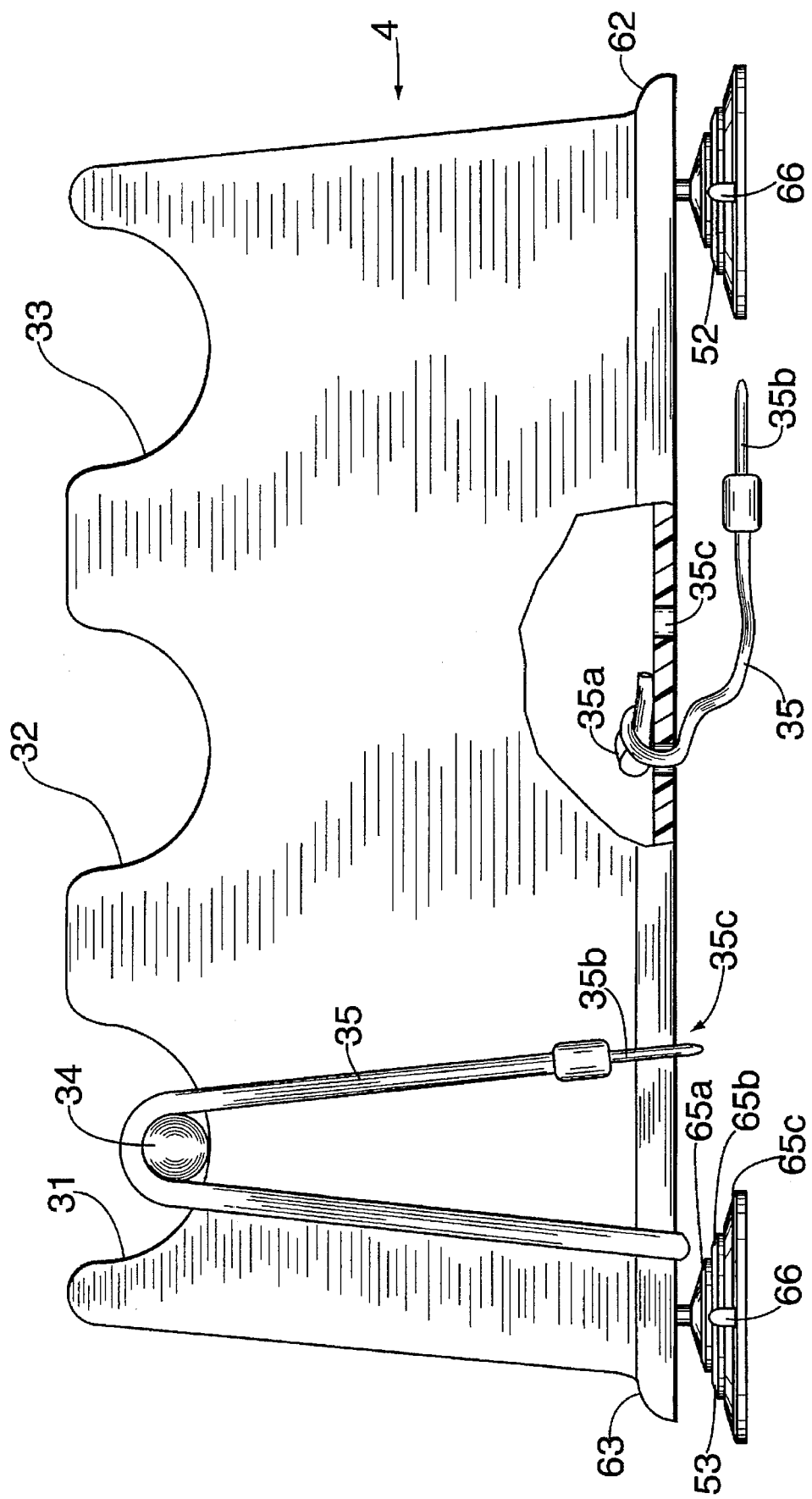
FIG. 5 is a front elevation thereof, in partial section.

At the forward end of the holder, one or a plurality, in this case three, semicircular recesses 31–33, FIG. 5 receive and locate the fiberglass shaft 34 of the fishing rod.

A stretchable tensile member, such as shock cord 35 extends from hole 35a in the underside of the holder 2, over rod shaft 34, and back to a hook 35b, which hooks into a hole 35c at the edge of the underside of the housing. This shock cord 35 serves to hold down the rod shaft.

Between the cylinders 8 and the recesses 31–33, a pair of slots 36, 38 define hand holes 40 and 42 in middle area 44. A groove 46 is molded between the two hand holes to receive and properly locate a roof tie-down, such as shock cord 50.

Light defusing clear plastic suction cups 51, 52, 53, 54 are mounted at all four corners 61–64 of holder 2. These suction cups are so powerful that they obviate the need for cord 50. In view of the effectiveness of these suction cups, shock cord 50 is not necessary, but is included in order to give the user an additional feeling of security for the roof mounted rod holder. The suction cups include at least one light diffusing ring 65a–c, which prevents the clear plastic suction cup from focusing sunlight to burn the surface it adheres to.

Pull-tab 66, allows the vacuum to be relieved and the suction cup to be thereby removed from the surface on which it has suctioned.

What is claimed is:

1. A fishing rod and reel holder, said reel mounted to the rod by a reel mount, said holder comprising:

a body;

said body comprising means for receiving the rod, said receiver means comprising:

a cylinder having two ends;

said cylinder having openings at both ends of the cylinder;

means for securing the rod and reel in the cylinder, said securing means comprising:

means for accepting the reel mount, said accepting means comprising a J-shaped slot defined in the cylinder, said J-shaped slot having edges defining a stem, a bottom, a curl, and a tip of the curl;

said J-shaped slot communicating with one of the openings;

said J-shaped slot further serving as means for sliding the reel mount from the communicated opening along the stem, across the bottom, up the curl, and against the tip;

elastic tensile means for biasing the reel mount against the tip and thereby securing the rod and reel within the cylinder;

said body comprising means for further supporting the rod, said support means comprising a recess approximately coaxial with the cylinder, and distal from the cylinder;

means for mounting said body securely to a surface.

2. Apparatus according to claim 1 in which the surface mounting means comprises four light diffusing suction cups secured to the body.

3. Apparatus according to claim 1 in which the body comprises a plurality of receiver means and support means.

4. Apparatus according to claim 1 in which the body has side edges and said body further comprises means for being hand-held, said hand hold means comprising a pair of hand holes located between the receiver means and support means and sufficiently near the side edges for the edges at the holes to be comfortable hand grips.

5. Apparatus according to claim 4, further comprising means for tensile securement to a roof, in which an indentation communicates between the hand holes as means for locating the tensile roof securement means.

6. Apparatus according to claim 5 in which the tensile roof securement means passes through the hand holes and across and within the indentation.

7. Apparatus according to claim 3 in which there are three receiver means and three corresponding support means.

8. Apparatus according to claim 1 in which the elastic tensile means also serves as means for biasing the reel against one of the cylinder openings.

9. A fishing rod and reel holder, said reel mounted to the rod by a reel mount, said holder comprising:

a body;

said body comprising means for receiving the rod, said receiver means comprising:

a cylinder having two ends;

said cylinder having openings at both ends of the cylinder;

means for securing the rod and reel in the cylinder, said securing means comprising:

means for accepting the reel mount, said accepting means comprising a J-shaped slot in the cylinder, said J-shaped slot comprising a stem, a bottom, a curl, and a tip of the curl;

said J-shaped slot communicating with one of the openings;

said J-shaped slot further serving as means for sliding the reel mount from the communicated opening along the stem, across the bottom, up the curl, and against the tip;

elastic tensile means for biasing the reel mount against the tip and thereby securing the rod and reel within the cylinder;

said body comprising means for further supporting the rod, said support means comprising a recess approximately coaxial with the cylinder, and distal from the cylinder;

in which the body comprises a plurality of receiver means and support means;

in which the body has side edges and said body further comprises means for being hand-held, said hand hold means comprising a pair of hand holes located between the receiver means and support means and sufficiently near the side edges for the edges at the holes to be comfortable hand grips;

an indentation communicating between the hand holes as means for locating a roof tie down;

the roof tie down passing through the hand holes and across and within the indentation; and means for mounting said body securely to a surface, in which the surface mounting means comprises four light diffusing suction cups secured to the body.

\* \* \* \* \*